United States Patent

Hunter et al.

[11] Patent Number: 5,604,629
[45] Date of Patent: Feb. 18, 1997

[54] DISCRETE VACUUM ULTRA VIOLET REFLECTIVE INTERFERENCE FILTER

[75] Inventors: William R. Hunter, Springfield, Va.; James P. Long, Accokeek, Md.

[73] Assignee: The United States of America as represented by the Secretary of the Navy, Washington, D.C.

[21] Appl. No.: 99,489

[22] Filed: Jul. 27, 1993

[51] Int. Cl.⁶ .................................................. G02B 5/20
[52] U.S. Cl. ................................... 359/359; 359/589
[58] Field of Search ............................... 359/359, 589, 359/585, 360

[56] References Cited

U.S. PATENT DOCUMENTS

| | | | |
|---|---|---|---|
| 4,408,825 | 10/1983 | Stelmack | 359/360 |
| 4,714,308 | 12/1987 | Sawamura et al. | 359/360 |
| 5,311,098 | 5/1994 | Seely et al. | 313/542 |

OTHER PUBLICATIONS

Raines, "The Wave Mechanics of Electrons in Metals" 1970.
Flaugh et al, "Development of a New Optical Wavelength Rejection Filter . . . Spectroscopy", Applied Spectroscopy vol. 38, #6, 1984 p. 847.

Seely et al, "Thin Film Interference Optics for Imaging the O +sc II 834°–Å Airglow," Applied Optics, vol. 30, #19, Jul. 1, 1991 pp. 2788–2794.

*Primary Examiner*—K. Hantis
*Attorney, Agent, or Firm*—Thomas E. McDonnell; Edward Miles

[57] ABSTRACT

A thin film reflecting interference filter (RIF) is designed to suppress unwanted harmonics thereby improving the monochromaticity of the radiation. An interference layer of material which has a well-defined plasma oscillation is deposited on a substrate and a mismatch layer is formed thereon. This interference layer exploits the interference between wavefronts reflected from the layer-substrate and the vacuum-layer interfaces to suppress higher order harmonics, while allowing good reflectance at the fundamental wavelength. This is achieved by positioning the RIF in the radiation at an angle of incidence which is greater than the critical angle of the desired fundamental wavelength, but less than critical angles of the harmonics to be suppressed. The mismatch layer increases the reflectance of the unwanted harmonics at the vacuum-layer interface, thus allowing more complete destructive interference of the unwanted harmonics. The RIF can be tuned by altering the thickness of the layer, the composition of the layer and/or the angle of incidence of the radiation.

15 Claims, 5 Drawing Sheets

DISCRETE VACUUM ULTRA VIOLET REFLECTIVE INTERFERENCE FILTER

BACKGROUND OF THE INVENTION

1. Field of the Invention

The present invention relates to an interference filter for reflecting discrete wavelengths in the vacuum ultraviolet region of the spectrum.

2. The Prior Art

When broad band radiation is incident on a grating monochromator, the output wavelength $\lambda_1$ (fundamental or first order) is contaminated with integrally related harmonics $\lambda_n = \lambda_1/n$ which are diffracted in the same direction. Typically, the strongest of these harmonics occurs when n=2 and is called the second order. The presence of these harmonics complicates vacuum ultraviolet (VUV) spectroscopies using synchrotron radiation because the source spectrum extends continuously over many harmonics. The photon energies in the VUV range, 10 to 100 eV (approximately 1200 Å through 120 Å) are difficult to process because most filter materials are too absorbent to be useful, unlike interference filters used in both transmission and reflection modes in the visible portion of the spectrum. Multiple layer mirrors, which also employ interference, are used at larger energies where absorption is sufficiently weak that radiation can penetrate several layers.

Bandpass reflectors in the long wavelength region of the VUV (roughly 1000–2000 Å) are disclosed in U.S. Pat. No. 4,408,825 to Stelmack and U.S. Pat. No. 4,714,308 to Sawamura et al. Both of these reflectors employ multiple layers and are concerned with filtering out an entire portion of the VUV region by sharply attenuating radiation having wavelengths longer than VUV.

One approach to decontaminating radiation at higher energies, i.e., greater than 40 eV (less than 310 Å), consists of using two or three critical angle mirrors positioned in a predetermined relationship. These critical angle mirrors exploit the wavelength dependence of the critical angle to absorb harmonics while reflecting the fundamental wavelength. At lower energies (higher wavelengths), the relative amount of fundamental radiation reflected compared to the amount of harmonics absorbed is too low for many applications. Further, since at least two or three reflections are required, losses are greater than those for a scheme requiring only a single interaction.

Presently, the only means of reducing unwanted radiation in the 10 to 100 eV range is by using transmission filters constructed of thin, free standing metallic films. These transmission filters rely on a limited number of absorption features associated with the electronic states of their constituent atoms in order to attenuate undesired photon energies. The fixed energies of these absorption features means that these features are only useful for certain first order-second order combinations of photon energy and do not suppress higher orders. Transmission filters are also extremely fragile, can be destroyed during pump down or venting of the vacuum system in which they are used, and are not tunable since they only work for specific first order-second order combinations. Further, when used in conjunction with a monochromator, these filters represent an additional source of attenuation of photons having the desired energy.

SUMMARY OF THE INVENTION

It is an object of the present invention to provide a supported thin film which reflects VUV radiation in such a way that a strongly suppressing destructive interference occurs at a selected harmonic while high reflectance is maintained at the fundamental wavelength.

It is a further object of the present invention to provide a reflecting interference filter (RIF) which can be tuned over a significant range by adjusting the angle of incidence.

It is a further object of the present invention to provide a filter in the VUV region which does not have to be incorporated into pre-existing monochromators and can be designed to work with these monochromators.

According to a first aspect of the invention, a vacuum ultraviolet reflecting interference filter device is provided which comprises a substrate, an interference layer, deposited on the substrate so as to create a layer-substrate interface and an ambient-layer interface, and a mismatch layer formed on the interference layer. The interference layer comprises material having a critical wavelength longer than a desired fundamental wavelength such that wavefronts incident on the device at angles less than a wavelength dependent critical angle are reflected from the layer-substrate interface and the ambient-layer, resulting in interference between the reflected wavefronts, and such that wavefronts incident on the device at angles greater than the wavelength dependent critical angle are reflected only from the ambient-layer interface. The mismatch layer has optical constants that are more different from optical constants of the interference layer material than the difference between ambient optical constants and optical constants of the interference layer material.

In an important embodiment of this aspect of the invention, the interference layer further comprises a naturally oxidized layer of the material. Advantageously, the material for the interference layer is selected from the group of consisting of silicon, boron, beryllium, germanium, indium, aluminum, tin, magnesium and carbon. In a preferred embodiment, the substrate comprises silicon dioxide, and the interference layer comprises silicon and has a thickness of 600 Å.

According to a second aspect of the invention, a VUV monochromator is provided which comprises an entrance slit, a diffraction grating positioned to intercept radiation emerging from the entrance slit, a reflecting interference filter for suppressing higher order harmonics including an interference layer having a critical wavelength longer than a desired fundamental wavelength positioned to intercept radiation dispersed by the diffraction grating at an angle of incidence greater than the critical angle of said desired fundamental wavelength and less than the critical angle of harmonics to be suppressed, and an exit slit for outputting radiation at the desired fundamental wavelength from the monochromator.

According to a third aspect of the invention, a method of suppressing higher order harmonics of VUV radiation includes the steps of depositing an interference layer having a critical wavelength longer than a desired fundamental wavelength onto a substrate, allowing the deposited interference layer to oxidize naturally to produce an oxidized layer and placing the oxidized interference layer in the path of VUV radiation at an angle of incidence greater than the critical angle of said desired fundamental wavelength and less than the critical angle of harmonics to be suppressed. When a new desired fundamental wavelength is selected, the filter can be tuned to suppress the harmonics of this new fundamental wavelength by adjusting the angle of incidence to be greater than the critical angle of the new desired fundamental wavelength and less than the critical angle of harmonics to be suppressed. The angle then may be adjusted within this range to minimize the unwanted harmonics.

According to a fourth aspect of the invention, a method for creating a vacuum ultraviolet filter for reflecting a desired fundamental wavelength and rejecting an unwanted harmonic wavelength includes the steps of selecting a material for an interference layer having a well-defined plasma oscillation and higher reflectance at said fundamental wavelength than at said harmonic wavelength, selecting a material for a mismatch layer having optical constants more different from optical constants of the interference layer material than the difference between ambient optical constants and optical constants of the interference layer material, selecting a substrate material having optical constants different from the interference layer material, depositing the interference layer material on the substrate, and depositing the mismatch layer material on the interference layer.

Other objects, features and advantages of the invention will be set forth or apparent from the following description of the preferred embodiments of the invention.

BRIEF DESCRIPTION OF THE DRAWINGS

FIGS. 3b to 8 concern the RIF of FIG. 3a, in particular:

FIG. 3b is a graph of calculated reflectance versus wavelength of the RIF at an angle of incidence of 57°;

FIG. 4 is a plot of the log of the calculated rejection ratio versus the thickness of the oxide layer at an angle of incidence of 57°;

FIG. 5 is a graph of measured reflectance versus wavelength of the RIF showing the reflectance around the 3/2 order minimum at three different angles of incidence;

FIG. 6 is a plot of the cosine of the angle of incidence versus wavelength, showing the calculated angular location of the half wave order minima of the RIF;

FIG. 7 is a plot of measured reflectance versus photon energy, with the top axis showing the angle of incidence being adjusted at each photon energy; and FIG. 8 is a plot of the rejection ratio with the top axis showing that the angle of incidence is adjusted at each photon energy.

DETAILED DESCRIPTION OF THE INVENTION

Figure 1:
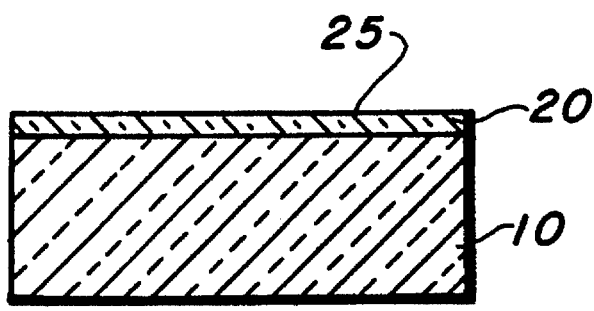
FIG. 1 is a sectional view of the reflecting interference filter according to the invention.

By way of brief introduction, it is noted that the present invention generally exploits reflections from materials exhibiting a well defined plasma oscillation, e.g., Al, Si, B, Be, C, Mg, Ge, Sn, In, etc. Such materials have a critical wavelength in the VUV region of the spectrum. At longer wavelengths, such materials behave as a metal with comparatively large reflectance values. At shorter wavelengths, however, these materials behave as a slightly lossy dielectric, i.e. for a particular wavelength, there is a critical angle of incidence above which reflectance values are large (frustrated total external reflection (FTER) will occur) and below which the reflectance values are very small. For such behavior to occur, the index of refraction, n, must be less than unity and the extinction coefficient, k, must be small. At angles of incidence smaller than the critical angle, such a material used as an interference layer on a RIF is sufficiently transmissive to shorter wavelengths that the interference between the wavefronts reflected from the vacuum-coating and the coating-substrate interfaces occurs, giving rise to maxima and minima in the reflectance spectrum. The wavelengths at which the interference maxima and minima occur are not fixed, but can be shifted by tilting the filter to change the optical path difference.

This interference cart be made more completely destructive at unwanted wavelengths by including a mismatch layer on top of the interference layer. For complete destructive interference, the interfering beams would be entirely out of phase and their amplitudes would be equal. Thus, while the mismatch layer effectively increases the difference between the refractive index of the vacuum and the interference layer, it serves to match the amplitude and increase the phase difference between the interfering beams. Typically, the thickness of the mismatch layer is very small compared to a wavelength, e.g., an order of magnitude less, thus, it can essentially be treated as a single surface. Since absorption is a great concern in the VUV region, there is a trade-off in determining the actual desired thickness of the mismatch layer, i.e. maximizing the phase difference between the beams reflected at the surface and those which traverse the interference layer, and minimizing the loss due to absorption of the mismatch layer, both of which increase with the thickness of the mismatch layer. Since there is not much contrast among the optical constants of materials in the VUV region, both the mismatch layer and the substrate should have as different indices of refraction from the interference layer as possible. The bigger these differences, the more pronounced the interference effects will be. One often advantageous material for the mismatch layer is the oxide layer which may be allowed to form naturally on the interference layer. If this oxide layer is stable, it can usually provide sufficient contrast to the optical constants to the interference layer.

Thus, designing an RIF of the present invention, advantageously involves the following considerations. First, a material for the interference layer must have a well defined plasma oscillation, i.e., the oscillation is separated from other absorptions and has no secondary absorption, at the desired wavelength. The material preferably should have a smaller n and k at the unwanted wavelength(s) than at the desired wavelength, i.e., reflectance in the region of interest should be greatest at the desired wavelength. Second, calculate an appropriate thickness for the interference layer for the desired wavelengths. Third, a material for the substrate should be selected preferably having optical properties which are different from those of the interference layer, and for which no interdiffusion between the interference layer and the substrate occurs. Fourth, a material for the mismatch layer should be selected, preferably having as different optical constants from the interference layer as possible. The difference between the optical constants of the mismatch and interference layers should be greater than the difference between the ambient optical constants and those of the interference layer. Advantageously, the mismatch layer should be stable and result in no interdiffusion between the mismatch layer and the interference layer. Finally, it is desirable to monitor the effect of the thickness of the mismatch layer on the performance of the RIF in order to determine the optimum thickness for the mismatch layer.

In a preferred embodiment of the present invention, shown in FIG. 1, the RIF consists of a planar substrate 10 on which a thin film 20 has been evaporated. The thin film has a critical wavelength which is greater than the desired fundamental wavelength. A very thin layer of material having different optical constants than the thin film is deposited on the thin film or the thin film is allowed to oxidize naturally, resulting in a mismatch layer indicated at 25.

In a specific embodiment of the present invention, the substrate is polished silicon dioxide ($SiO_2$) and the thin film is silicon (Si). Silicon alone has a high reflectance at the desired fundamental wavelength and a low reflectance at the second harmonic wavelength to be rejected. It would seem desirable, however, to increase the reflectance of the unwanted wavelength of the first surface is in order to facilitate more complete destructive interference at the unwanted wavelength, as discussed above. Therefore, the rejection of the unwanted harmonic may be improved by including mismatch layer 25, which does not significantly affect the reflectance of the RIF at the fundamental wavelength, but does dramatically alter the reflectance at the unwanted wavelength.

Silicon film 20, at a thickness, for example, of 600 Å, will reject photons with energy near 40 eV (310 521) and reflect photons with 20 eV (620 Å). A He resonance lamp may be used to supply a beam of radiation containing approximately both 40 eV and 20 eV photons. The filler is positioned in a beam of radiation containing 20 eV and 40 eV photons. The angle between the plane of the filter and the beam of radiation is a controlled variable. At an appropriately selected angle, the spectrally reflected radiation will contain a minimal amount of 40 eV radiation and roughly 40% of the incident 20 eV radiation. If the composition of the incident radiation is altered, the angle between the filter and the input radiation is adjusted so that the reflected radiation contains a minimum amount of radiation at the new second order energy.

Figure 2:
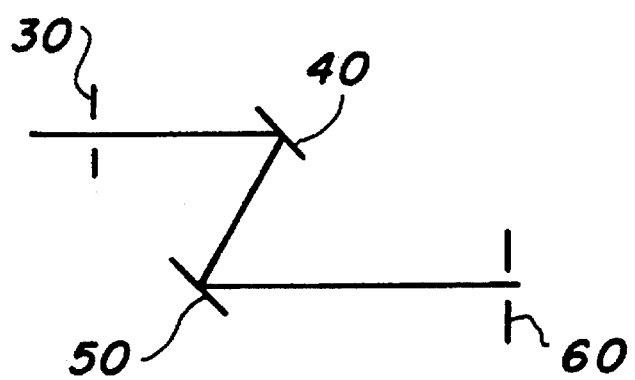
FIG. 2 is a schematic view of a monochromator using a reflecting interference filter according to the invention.

In addition to processing radiation from a monochromator, the RIF itself can be used as an element in a double grating monochromator by substituting the RIF for one of the gratings. Such a configuration is shown in FIG. 2, in which radiation enters the monochromator through input slit 30, is dispersed by diffraction grating 40, is reflected by RIF 50 and exits the monochromator through the exit slit 60. In such a configuration, the RIF introduces no additional source of attenuation of the photon energy at the desired wavelength. If the monochromator is a scanning monochromator, the angle of incidence of the radiation on filter 50 and grating 40 will be varied to pass the first order radiation as mandated by the grating equation. As the monochromator is scanned, the minimum reflectance of filter 50 at the second order will automatically track the first order over a range limited only by the energy dependence of the optical constants of filter 50. This tracking occurs because the equation which predicts the energy and incidence angle at which The reflectance of filter 50 is minimized through destructive interference is of the same mathematical form as the grating equation (to the extent that k can be neglected, a minimum occurs when twice the thickness of the layer times the refractive index of the layer times the cosine of the angle of incidence at the layer-substrate interface equals an odd multiple of the half wavelength).

The performance characteristics of the specific embodiment of the present invention employing $SiO_2$ and Si are shown in FIGS. 3–8, discussed below. The calculated data were generated using the admittance concept disclosed in P. Berning, "Theory and calculations of optical thin films" Phys. Thin Films, Vol. 1, pp.69–121 (1963), which takes into consideration the absorbance of materials and is equivalent to the Bragg law modified to include the effects of optical constants. Optical constants for materials may be obtained from Handbook of optical constants of solids I and II, E. D. Palik, Ed., Academic Press, Orlando, 1991. Measured data were generated using a UHV reflectometer attached to a grating/crystal monochromator on the Naval Research Laboratory beam line X24-C at the National Synchrotron Light Source.

Figure 3A:
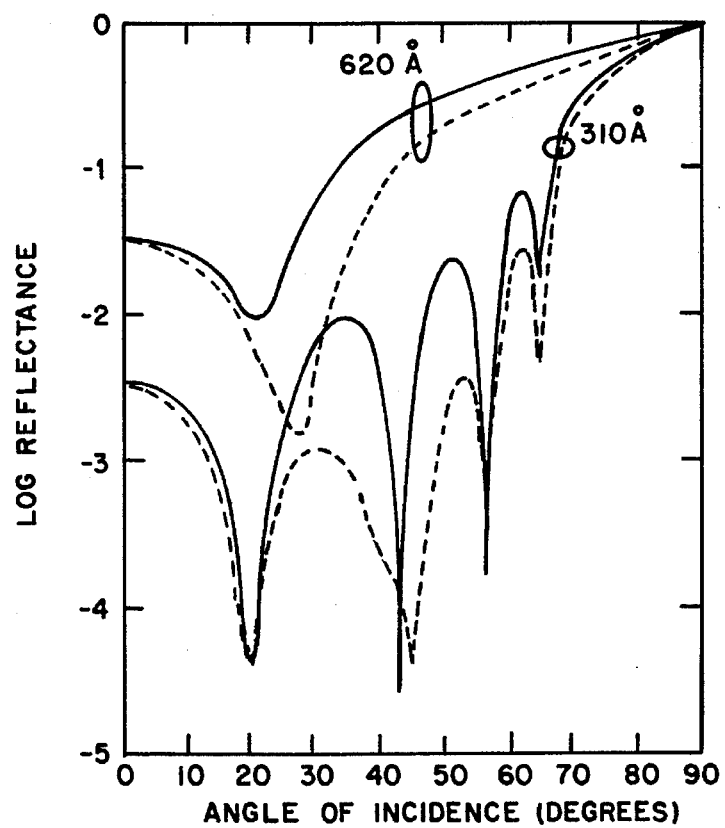
FIG. 3a is a graph of calculated reflectance versus angle of incidence at two wavelengths, 620 Å and 310 Å, of a RIF of the present invention.

FIG. 3a shows the calculated reflectance versus angle of incidence at wavelengths of 620 Å, and 310 Å of a RIF consisting of a $SiO_2$ substrate having a 600 Å thick layer of Si with a natural oxide layer of 30 Å. These two wavelengths are shorter than 760 Å, the critical wavelength of Si, therefore, the indices of refraction are less than unity and the extinction coefficients are small in the spectral region of interest. The dashed lines represent the parallel component of reflection $R_p$ and the solid lines represent the perpendicular component of reflection $R_s$. The presence of large reflectance values at angles of incidence less than grazing indicate FTER. The abrupt drop in reflectance, at about 30° for 620 Å and 70° for 310 Å, locates the critical angle for each wavelength. At smaller angles of incidence, a prominent series of destructive interference minima can be seen from the 310 Å reflectance. In particular, a 3/2 order interference minimum occurs at an angle of incidence of 57°, where the order of interference refers to the path difference, measured in wavelengths, between the waves reflected from the RIF-vacuum and RIF-substrate interfaces. The reflectance for s-polarized radiation at 620 Å is approximately 2600 times greater than that for 310 Å. This plot demonstrates the tunability of the RIF by illustrating the extreme differences in reflectance values at varying angles of incidence.

Figure 3B:
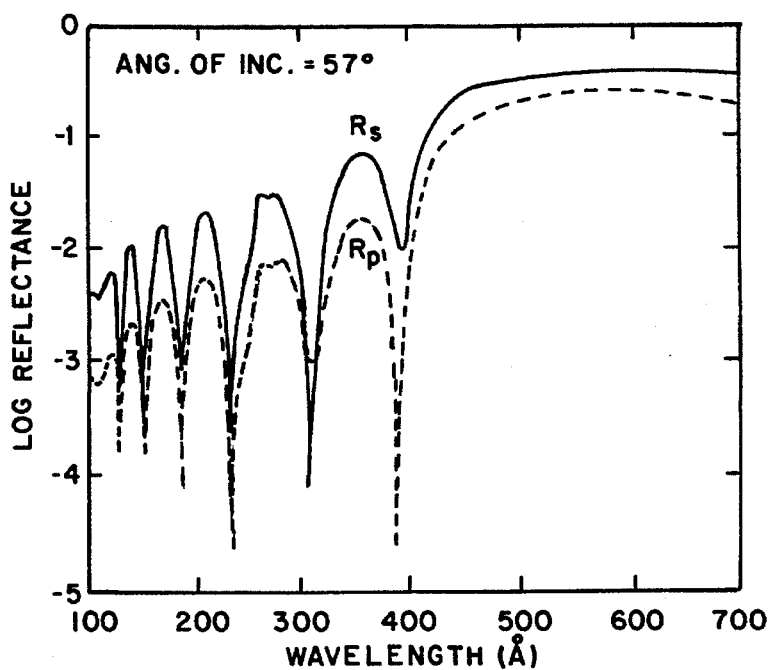

FIG. 3b shows the reflectance versus wavelength from 100 Å through 700 Å at an angle of incidence of 57°. For this angle of incidence, the transition from FTER to small reflectance values occurs at about 400 Å. Thus, at longer wavelengths, the RIF resembles a metallic reflector, while at shorter wavelengths, it resembles a semi-transparent dielectric, so that the reflectance spectrum has interference maxima and minima. For fundamental wavelengths longer than 400 Å, harmonic radiation coinciding with any of the minima will be suppressed with respect to the fundamental wavelength. This plot shows that the RIF, even at a fixed angle of incidence, may be useful for suppressing unwanted harmonics for a number of fundamental wavelengths.

Optimum suppression will be polarization dependent. The plots shown in FIGS. 3a and 3b demonstrate that generally the perpendicular component of reflection $R_s$ has a larger value than the parallel component $R_p$. For some of the minima, the opposite is true. This reversal is due to the mismatch layer.

Figure 4:
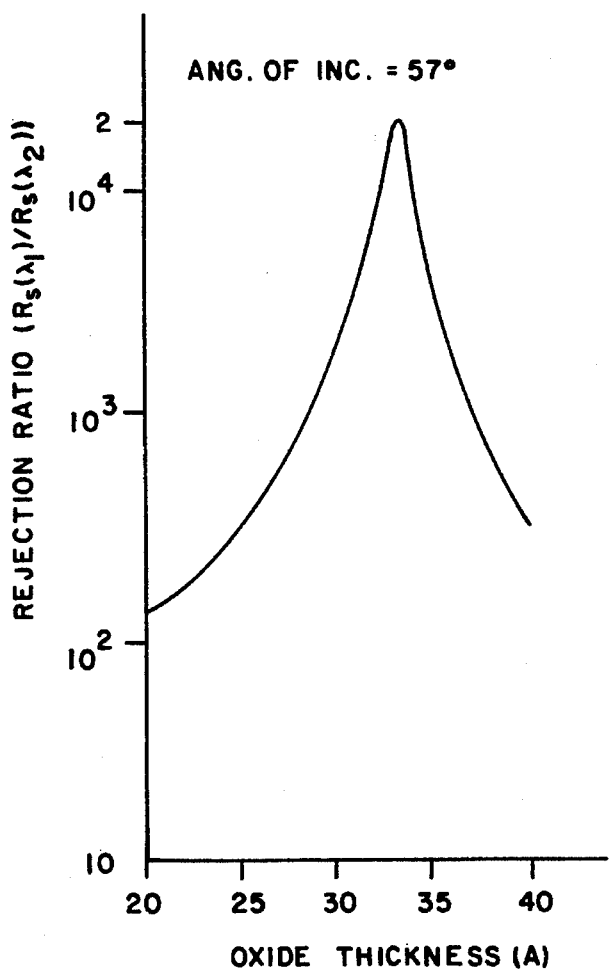

As shown in FIG. 4, the mismatch layer also controls the overall performance of the RIF. An increase in mismatch layer thickness slightly alters the angle of incidence at which an interference minimum occurs at the second order wavelength and dramatically increases, by orders of magnitude, the rejection ratio $r=R_s(\lambda_1)R_s(\lambda_2)$. It is believed that this mismatch layer alters the phase shift, allowing the interference to be more totally destructive. The rejection ratio peaks where the destructive interference at $\lambda_2$ is most complete, which, in the present specific embodiment, occurs when the mismatch layer thickness is 32 Å.

Figure 5:
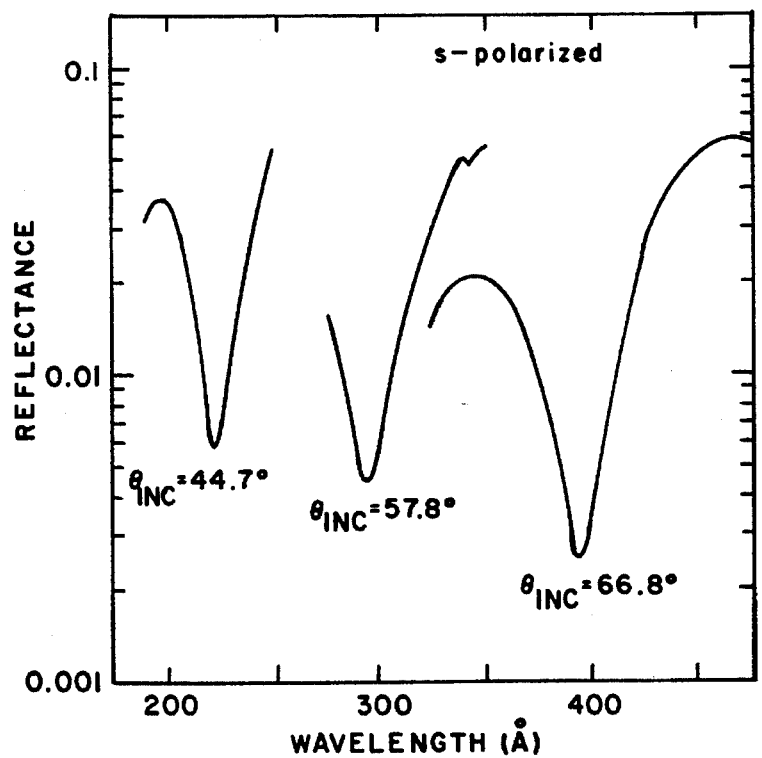

As the angle of incidence is changed, the minima of FIG. 3b shift in wavelength, permitting tuning of the RIF. This is illustrated in FIG. 5, which shows the reflectance around the 3/2 order minimum of the RIF with three different angles of incidence, where again the order of interference is the path difference in wavelengths between radiation reflecting from the top surface and that traversing the RIF. This plot shows the wide tuning capability of the RIF, obtaining similar magnitudes of reflectance minima over a wide range of wavelengths simply by altering the angle of incidence, indicating usefulness of the RIF over a correspondingly wider range of fundamental wavelengths.

Figure 6:
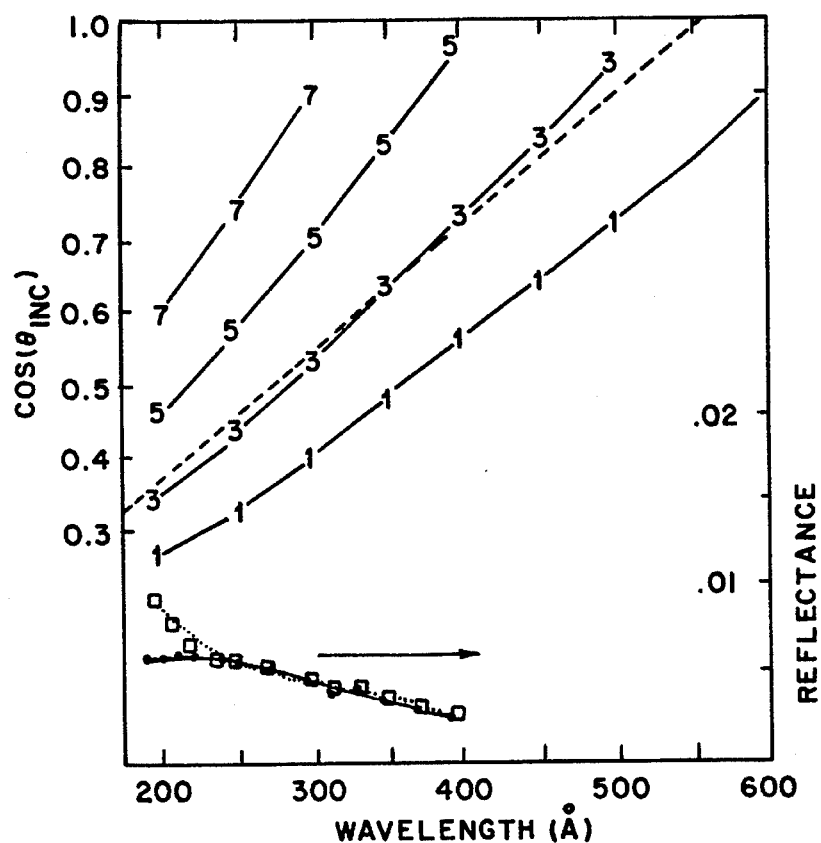

FIG. 6 shows the wavelengths of the minima as a function of the cosine of the incident angle, with the numbers labelling the curves give the half wave order of interference. The labelled plots represent a configuration in which an ideal RIF replaces one of the gratings in a double grating monochromator. The straight line in FIG. 6 represents a plot of the second harmonic wavelength $\lambda_2=\lambda_1/2$ versus the cosine of the incident angle for the monochromator as it is scanned on-blaze to deliver $\lambda_1$ from a blazed 600/millimeter grating. The dashed line shows how the location of the 3/2 order of interference of the RIF would behave if n and k were independent of wavelength. The overlap of the dashed line and the 3/2 order minimum curve demonstrates that the 3/2 order minimum remains close to the second grating harmonic as the monochromator is scanned, thus providing good rejection of this harmonic over a fairly wide wavelength range.

This overlap can also be seen in the unlabelled plot in the lower portion of FIG. 6, in which the closed circles represent the measured reflectance of the RIF at the 3/2 order minimum and the olden squares represent the reflectance of the RIF at the second grating harmonic when the, RIF is used in a monochromator. Both sets of plots demonstrate that the reflectance minima track the grating wavelengths as the angle of incidence is altered. In applications providing more freedom in selecting an incident angle than is possible in a blazed grating monochromator, the layer thickness of the RIF can be adjusted so that the interference minima suppress both the second and third grating harmonic simultaneously, although with a corresponding reduction in the tuning range.

Figure 7:
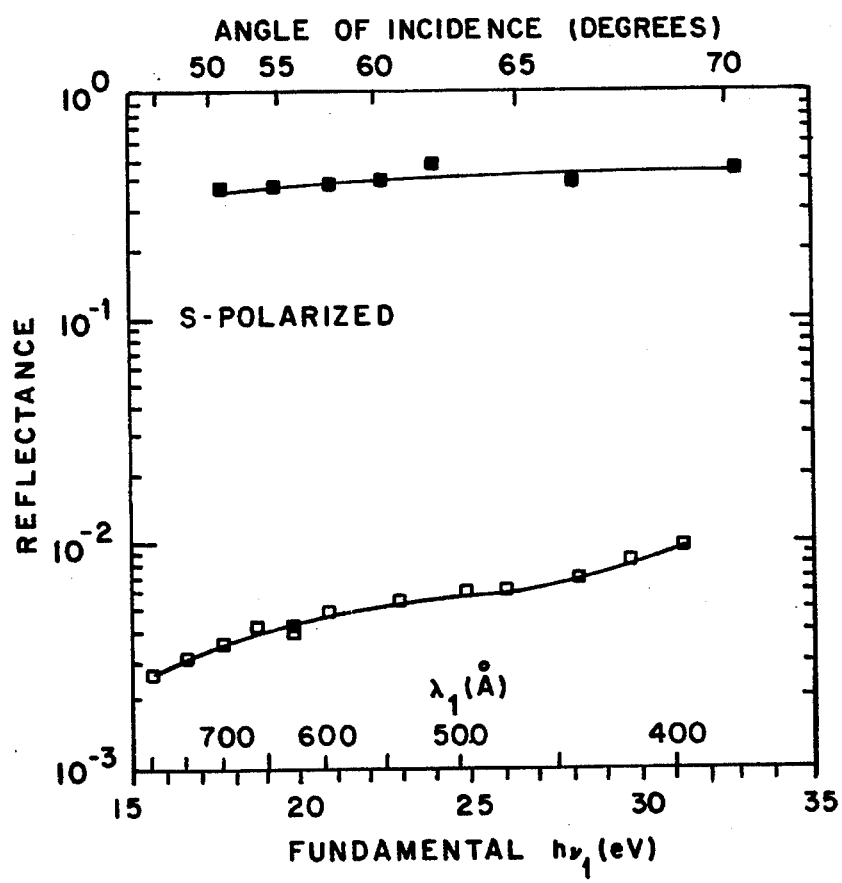

FIG. 7 shows reflectance versus fundamental wavelength $\lambda_1$ and corresponding energy $hv_1$. Since the angle of incidence is adjusted with the fundamental wavelength, a separate axis is provided at the top of the plot to show the angle of incidence at each measurement. For these measurements, the reflectometer was oriented so that the predominately horizontally polarized synchrotron radiation was incident as S-polarized radiation. The upper curve represents the reflectance at the fundamental wavelength and the bottom curve shows the reflectance at the second grating harmonic, i.e., at half the fundamental wavelength.

Figure 8:
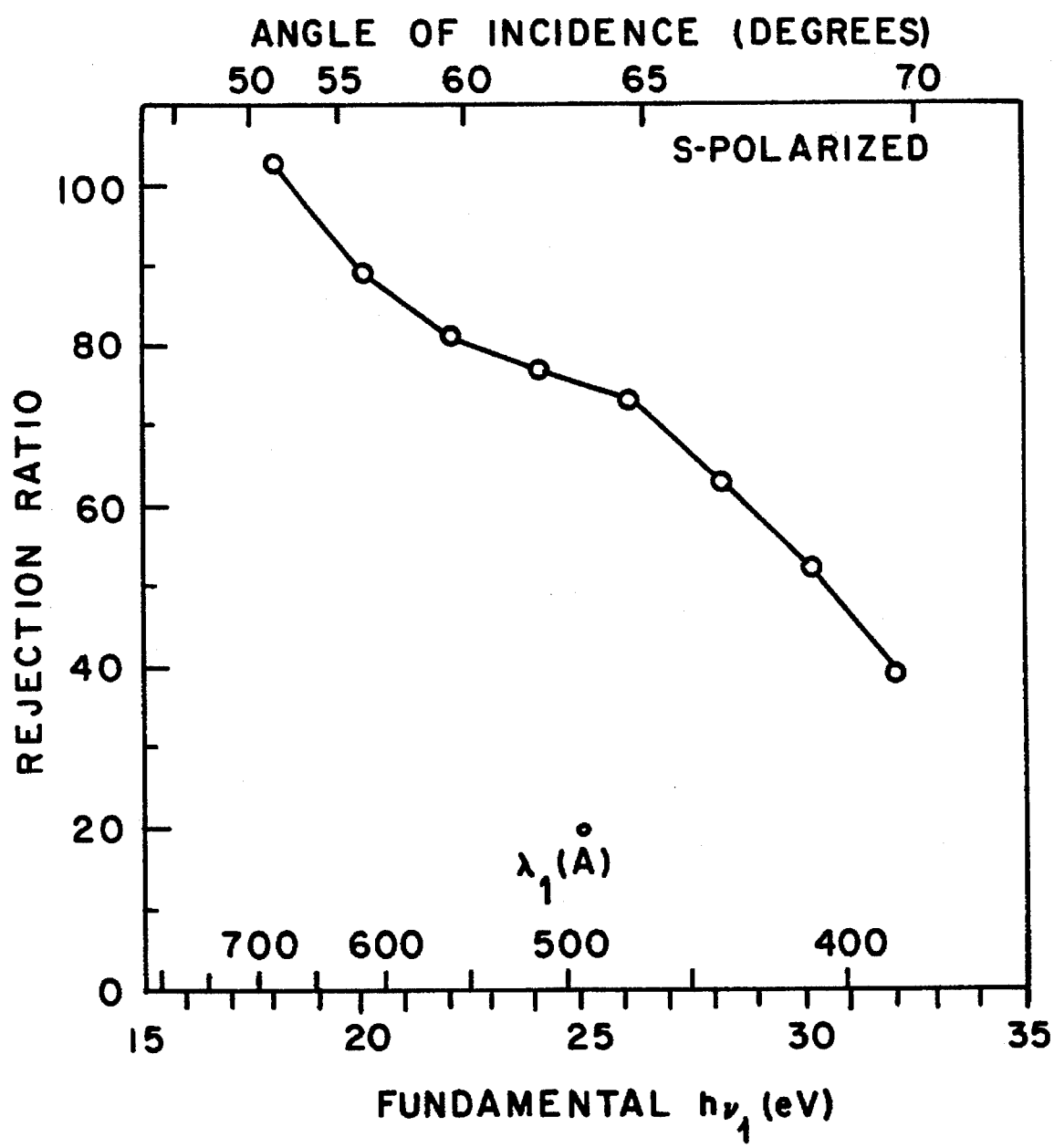

The ratio of the reflectance shown in FIG. 7 provides the rejection ratio plotted. As shown in FIG. 8, a rejection ratio in excess of 70 over the photon energy rate of 15–25 eV was maintained. Again, the angle of incidence was adjusted with the photon energy as dictated by the grating equation. The plots in FIGS. 7 and 8 illustrate how a difference between the amount of reflected radiation at the fundamental wavelength and the amount of reflected radiation at the second harmonic of over an order of magnitude may be maintained using the RIF over a continuous, wide spectral region when the angle of incidence is appropriately adjusted.

The RIF of the present invention thus overcomes the limitations of the transmission filters. Such RIFs are robust and can be fabricated on large substrates. Further, the wavelengths, rejected by an RIF having a thin film of a particular material can be altered by adjusting the thickness of the film, and, for a given film thickness, the RIF is tunable by adjusting the angle of incidence. The RIFs generally maintain good reflectivity in the desired VUV region.

Alternative materials can be used as the interference layer. Any element with a well defined plasma oscillaton that can be deposited on a substrate may be used. For example, boron, beryllium, carbon, silicon, aluminum, magnesium, tin, germanium, indium and the like are suitable candidates. The substrate material used is not important as long as no interdiffusion between substrate and the thin interference layer occurs.

Although the present invention has been described above relative to exemplary preferred embodiments thereof, it will be understood by those skilled in the art that variations and modifications can be effected in these embodiments without departing from the scope and spirit of the invention as defined in the claims which follow.

What is claimed is:

1. A vacuum ultraviolet reflecting interference filter device comprising:

a substrate;

an interference layer, deposited on said substrate so as to create a layer-substrate interface and an ambient-layer interface, said interference layer comprising material having a critical wavelength longer than a desired fundamental wavelength such that wavefronts incident on said device at angles less than a wavelength dependent critical angle are reflected from said layer-substrate interface and said ambient-layer interface, resulting in interference between reflected wavefronts, and such that wavefronts incident on said device at angles greater than said wavelength dependent critical angle reflected only from said ambient-layer interface; and a mismatch layer, having optical constants more different from optical constants of said material than the difference between ambient optical constants and optical constants of said material, formed on top of said interference layer;

wherein said material has a well-defined plasma oscillation.

2. A device as recited in claim 1, said mismatch layer being a naturally oxidized layer of said material.

3. A device as recited in claim 1, wherein said substrate comprises silicon dioxide.

4. A device as recited in claim 1, said material being selected from the group of consisting of silicon, boron, beryllium, aluminum, tin, magnesium, germanium, indium and carbon.

5. A device as recited in claim 3, said material comprises silicon and said interference layer being 600 Å thick.

6. A device as recited in claim 1, wherein said mismatch layer is an order of magnitude thinner than said interference layer.

7. An interference reflector for reflecting one optical wavelength $\lambda_1$ and rejecting another optical wavelength $\lambda_2$, said filter comprising:

a substrate;

an interference layer having a well-defined plasma oscillation; and a mismatch layer;

wherein said substrate is optically mismatched to said interference layer, said mismatch layer is optically mismatched to said interference layer, n<k for said mismatch layer at said $\lambda_2$, said plasma oscillation causes the critical wavelength $\lambda_c$ of said interference layer to be between said $\lambda_1$ and said $\lambda_2$ such that $\lambda_2<\lambda_c<\lambda_1$; and wherein the thicknesses of said interference layer and said mismatch layer are selected to cause the reflectance of said reflector to be about at a reflective minimum at said $\lambda_2$.

8. The filter of claim 7, wherein:

said interference layer is silicon, said mismatch layer is $SiO_2$, and the thickness of said interference layer is about 600 Å.

9. The filter of claim 7, wherein said $\lambda_2$ is in the vacuum ultraviolet.

10. An interference filter for filtering light having a preselected light frequency, comprising:

a substrate; and an interference layer means, disposed on said substrate, for destructively interfering light traversing said layer means towards said substrate, with light traversing said layer means reflected away from said substrate;

wherein said layer means is of a material having a well-defined plasma oscillation; and wherein said filter further comprised means for directing said light at said filter at an angle between the critical angle of said material for said frequency, and the critical angle of said material for at least one preselected harmonic of said frequency.

11. The filter of claim 10, wherein said filter comprises means for rotatably varying said angle at which said means for directing directs said light at said filter, effective to permit selectable variation of which harmonic of said frequency is said at least one preselected harmonic.

12. The filter of claim 10, wherein said frequency is in the VUV.

13. A method of filtering harmonics of a selected frequency in an optical source, comprising:

employing an interference layer on a reflective substrate, said interference layer having a well-defined plasma oscillation; and directing said light at said interference layer at an angle between the critical angle of said interface layer for said frequency, and the critical angle of said interference layer for at least one selected harmonic of said frequency, effective to cause said interference layer to be highly reflective of said frequency, and highly transmissive of said harmonic.

14. The method of claim 13, wherein said method further comprises selectably rotating said interference layer to cause said directing of said light is at an angle between said critical angle of said interference layer for said frequency, and normal incidence, effective to permit selection of said at least one selected harmonic.

15. The method of claim 13, wherein said frequency is in the VUV.

* * * * *